(12) United States Patent
Martinez, Jr. et al.

(10) Patent No.: US 11,199,658 B2
(45) Date of Patent: Dec. 14, 2021

(54) SINGULATION OF OPTICAL WAVEGUIDE MATERIALS (71) Applicant: Magic Leap, Inc., Plantation, FL (US)

(72) Inventors: Arturo Manuel Martinez, Jr., Austin, TX (US); Vikramjit Singh, Pflugerville, TX (US); Michal Beau Dennison Vaughn, Round Rock, TX (US); Joseph Christopher Sawicki, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/126,574

(22) Filed: Dec. 18, 2020

(65) Prior Publication Data
US 2021/0191041 A1 Jun. 24, 2021

Related U.S. Application Data (60) Provisional application No. 62/951,261, filed on Dec. 20, 2019.

(51) Int. Cl.
B23K 26/359 (2014.01)
B23K 26/364 (2014.01)
G02B 6/132 (2006.01)
G02B 6/138 (2006.01)
B23K 26/38 (2014.01)
G02B 6/12 (2006.01)
C03B 33/02 (2006.01)

(52) U.S. Cl.
CPC ............ *G02B 6/132* (2013.01); *B23K 26/359* (2015.10); *B23K 26/364* (2015.10); *B23K 26/38* (2013.01); *G02B 6/138* (2013.01); *C03B 33/0222* (2013.01); *G02B 2006/1218* (2013.01); *G02B 2006/1219* (2013.01); *G02B 2006/12171* (2013.01)

(58) Field of Classification Search
None
See application file for complete search history.

(56) References Cited

U.S. PATENT DOCUMENTS

2007/0202619 A1* 8/2007 Tamura ................. B23K 26/53 438/22
2010/0102042 A1* 4/2010 Garner ................. C03B 33/093 219/121.68
2019/0185376 A1* 6/2019 Ito ......................... C03C 21/002

* cited by examiner

*Primary Examiner* — Chad H Smith
(74) *Attorney, Agent, or Firm* — Fish & Richardson P.C.

(57) ABSTRACT

Methods for singulating an optical waveguide material at a contour include directing a first laser beam onto a first side of the optical waveguide material to generate a first group of perforations in the optical waveguide material. A second laser beam is directed onto a second side of the optical waveguide material to generate a second group of perforations in the optical waveguide material. The second side is opposite the first side. The first group of perforations and the second group of perforations define a perforation zone at the contour. A third laser beam is directed at the perforation zone to singulate the optical waveguide material at the perforation zone.

20 Claims, 8 Drawing Sheets

Direct, by a first laser, a first laser beam onto a first side of an optical waveguide material to generate a group of perforations in the optical waveguide material
504

Direct, by a second laser, a second laser beam onto a second side of the optical waveguide material to generate a second group of perforations in the optical waveguide material, wherein the second side is opposite the first side, and the first group of perforations and the second group of perforations define a perforation zone at the contour
508

Direct, by a third laser, a third laser beam at the perforation zone to singulate the optical waveguide material at the perforation zone
512

FIG. 5

SINGULATION OF OPTICAL WAVEGUIDE MATERIALS

CROSS-REFERENCE TO RELATED APPLICATION

This application claims priority to U.S. Application Ser. No. 62/951,261, filed on Dec. 20, 2019, which is incorporated by reference herein in its entity.

TECHNICAL FIELD

This disclosure relates to singulating optical waveguide materials.

BACKGROUND

Traditional methods that use milling or water jets to cut optical substrates can cause stresses in the substrate. Excess substrate stress can cause pieces of the substrate to separate along paths that are not in accordance with the singulation program.

SUMMARY

Innovative aspects of the subject matter described in this specification include methods, apparatus, and systems for singulating an optical waveguide material at a contour. A first laser beam is directed onto a first side of the optical waveguide material to generate a first group of perforations in the optical waveguide material. A second laser beam is directed onto a second side of the optical waveguide material to generate a second group of perforations in the optical waveguide material. The second side is opposite the first side. The first group of perforations and the second group of perforations define a perforation zone at the contour. A third laser beam is directed at the perforation zone to singulate the optical waveguide material at the perforation zone.

Among others, the benefits and advantages of the embodiments disclosed herein include the manufacture of optical waveguides for monocular or binocular headsets having enhanced visual qualities and performance compared to traditional methods. The embodiments provide the generation of complex shapes having demanding geometries for critical optical alignment from birefringent substrates of varying thickness and indices of refraction. The incising of a localized region surrounding a critical area of interest provides reduced wafer-level stress compared to traditional methods. Thus stress cracks and fractures along the preferential crystalline internal structure are reduced compared to traditional methods, and the process yield is increased.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
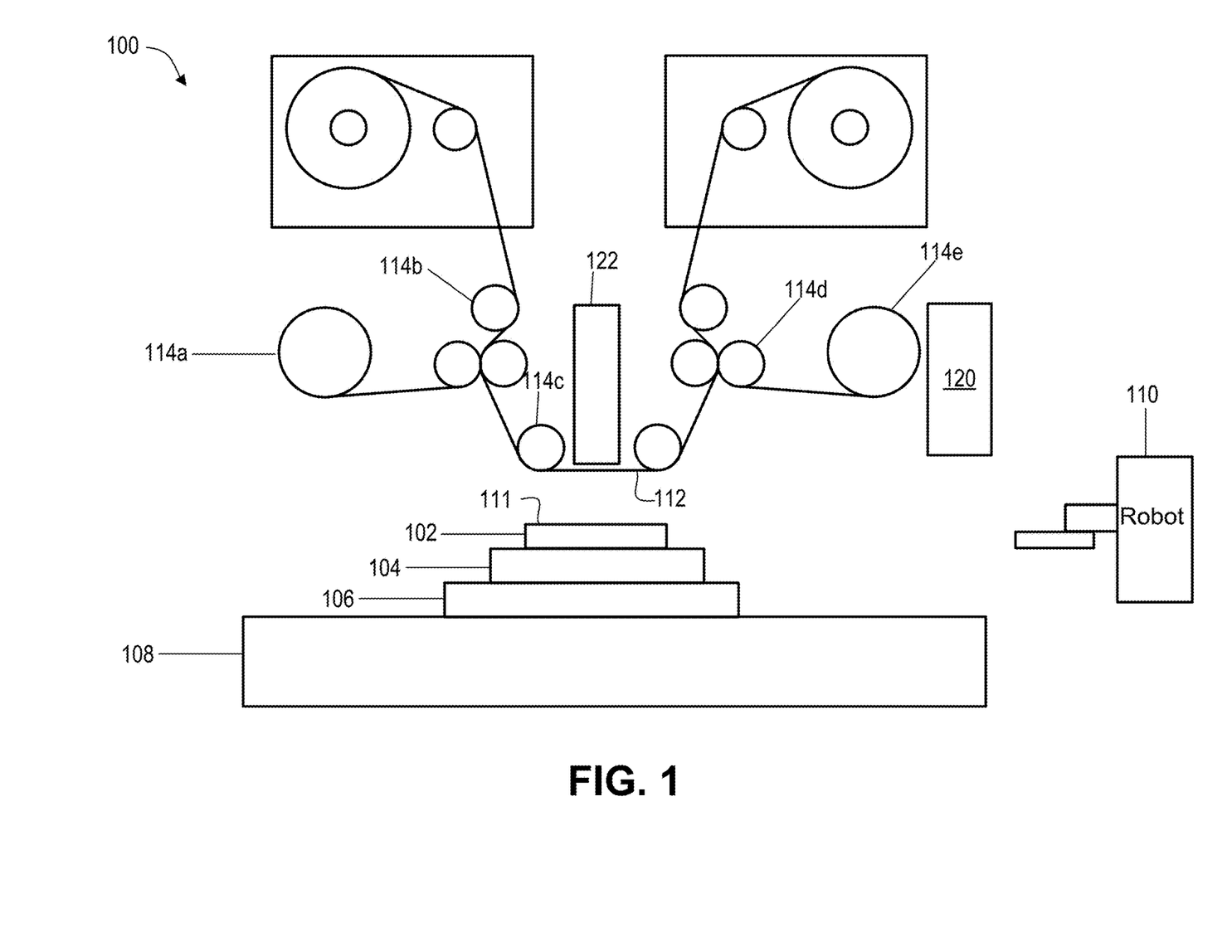
FIG. 1 illustrates a side view of a system that forms a relief pattern on a substrate.

FIG. 1 illustrates a system 100 that forms a relief pattern on a substrate 102. The substrate 102 can be coupled to a substrate chuck 104. In some embodiments, the substrate chuck 104 includes a vacuum chuck, a pin-type chuck, a groove-type chuck, or an electromagnetic chuck. In some embodiments, the substrate 102 and the substrate chuck 104 are further positioned on an air bearing 106. The air bearing 106 provides motion about the X, Y, or Z-axes. In some embodiments, the substrate 102 and the substrate chuck 104 are positioned on a base. The air bearing 106, the substrate 102, and the substrate chuck 104 can also be positioned on a stage 108. In some embodiments, a robot 110 (including a motor) positions the substrate 102 on the substrate chuck 104.

The system 100 further includes an imprint lithography flexible coated resist template 112 that is coupled to one or more rollers 114a, 114b, 114c, 114d, 114e. The rollers 114a, 114b, 114c, 114d, 114e provide movement of the flexible coated resist template 112. Such movement can selectively provide different portions of the flexible coated resist template 112 in superimposition with the substrate 102. In some embodiments, the flexible coated resist template 112 includes a patterning surface that includes a group of features, e.g., spaced-apart recesses and protrusions. The patterning surface can define any original pattern that defines the basis of a pattern to be formed on substrate 102. In some embodiments, the flexible coated resist template 112 is coupled to a template chuck, e.g., a vacuum chuck, a pin-type chuck, a groove-type chuck, or an electromagnetic chuck.

The system 100 can further include a fluid dispenser 120. The fluid dispenser 120 can be used to deposit a polymerizable material on the substrate 102. The polymerizable material can be positioned upon the substrate 102 using drop dispense, spin-coating, dip coating, chemical vapor deposition, physical vapor deposition, thin film deposition, or thick film deposition. The system 100 can further include an energy source 122 to direct energy (such as from a laser beam) towards the substrate 102. In some embodiments, the rollers 114 and the air bearing 106 are configured to position a desired portion of the flexible coated resist template 112 and the substrate 102 in a desired positioning. The system 100 can be regulated by a controller in communication with the air bearing 106, the rollers 114, the fluid dispenser 120, or the energy source 122, and may operate on a computer readable program stored in a memory.

Figure 2A:
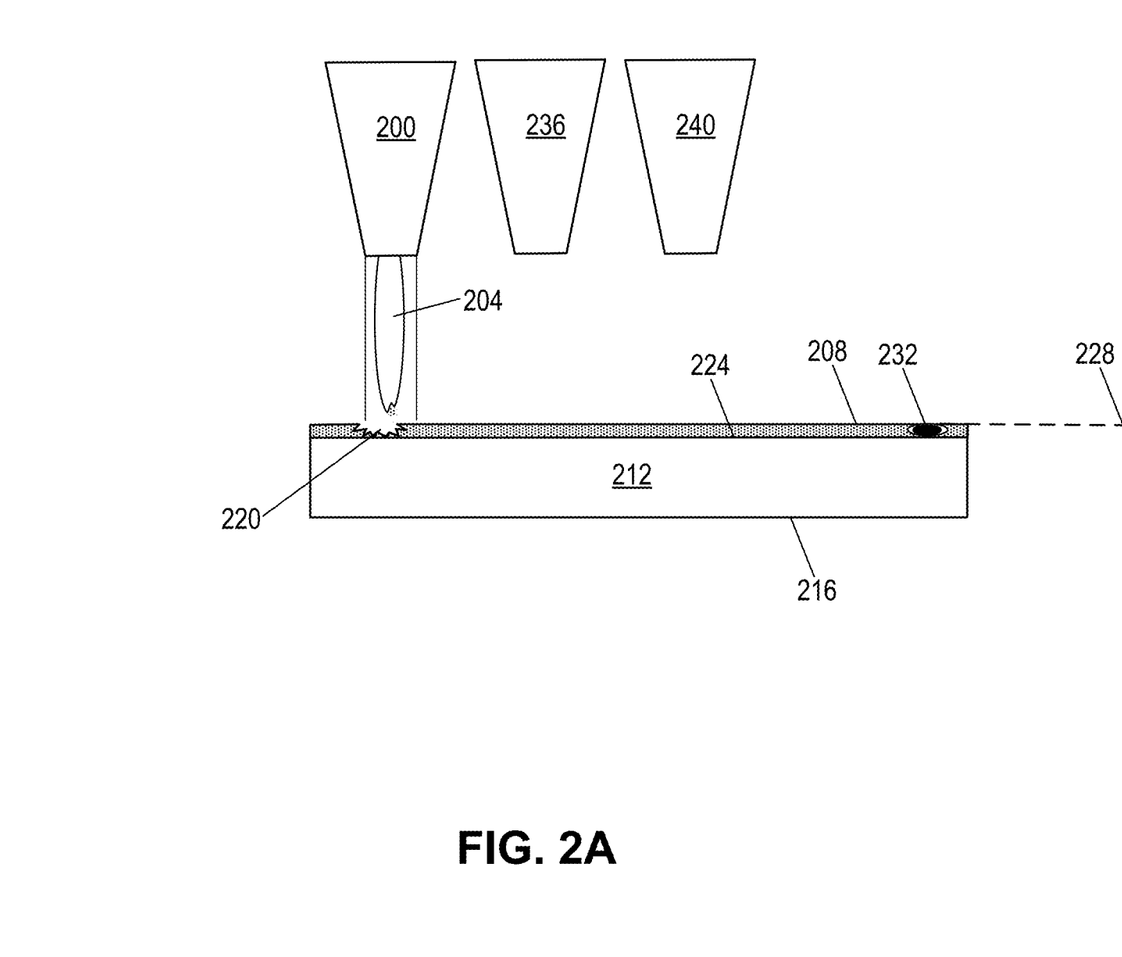
FIG. 2A illustrates a cross section of a laser directing a laser beam onto a side of an optical waveguide material.

FIG. 2A illustrates a cross section of a laser beam 204. The laser beam 204 is emitted by a laser 200 and directed onto a first side 208 of an optical waveguide material 212. The optical waveguide material 212 is a spatially inhomogeneous material used for manufacturing an optical waveguide for guiding light, for example, in an augmented reality headset. The optical waveguide material 212 restricts a spatial region in which light can propagate. In some embodiments, the optical waveguide material 212 is less than 1 mm thick. In some embodiments, the optical waveguide material 212 is a crystalline material having a refractive index greater than 1.6. For example, the optical waveguide material 212 can be formed of one or more of $LiNbO_3$, $LiTaO_3$, or SiC.

Figure 3:
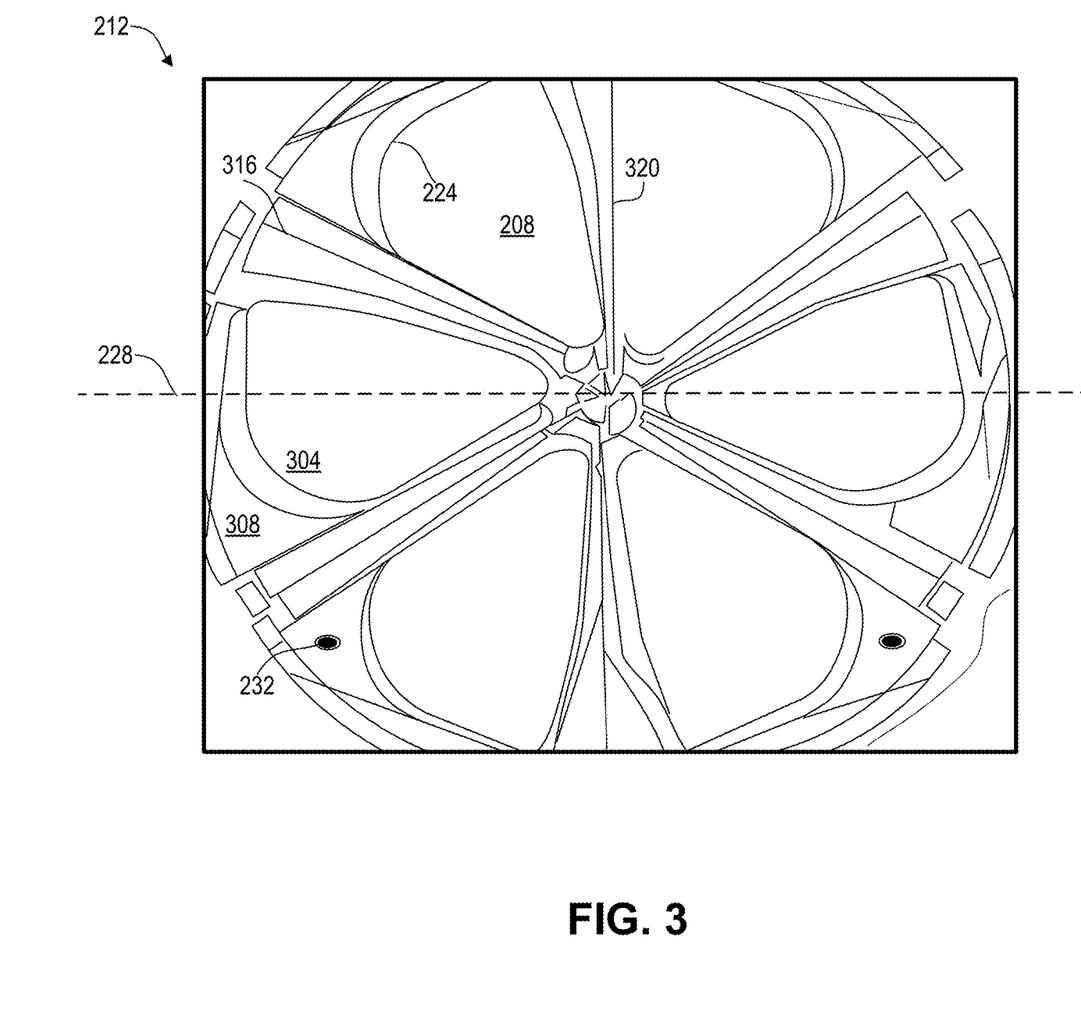
FIG. 3 illustrates a planar view of an optical waveguide material.

The laser 200 illustrated in FIG. 2A is configured to perforate the optical waveguide material 212 at the contour 224. The contour 224 can be defined in a computer image used for manufacturing an optical eyepiece, such as for an augmented reality headset. The contour 224 defines a shape of a first piece 304 of the optical waveguide material 212 that is to be singulated from a second piece 308 of the optical waveguide material 212 for manufacturing an optical device. For example, the first piece 304 can be used for manufacturing an optical eyepiece. The first piece 304 and the second piece 308 of the optical waveguide material 212 are illustrated in FIG. 3.

Prior to singulating the optical waveguide material 212, a first laser beam (such as the laser beam 204) is directed from a first laser (such as the laser 200) onto the optical waveguide material 212 to incise a set of fiducial markers 232 in the optical waveguide material 212. In some embodiments, the first laser beam 204 is directed onto the optical waveguide material 212 by the laser 200. In other embodiments, the first laser beam 204 is directed by a controller, the robot 100, or a motor. In some embodiments, the first laser 200 is a diode-pumped laser. For example, the first laser 200 can be a solid-state laser that uses a diode-pumped, mode locked system with ultra-short pulses and a high pulse energy. In some embodiments, a wavelength of the first laser beam 204 is in a range from 750 nm to 1500 nm.

The set of fiducial markers 232 are in a spaced relationship with the contour 224 and are used as points of reference or a measure. For example, the computer image used for manufacturing an eyepiece or other optical device can define the fiducial markers 232 to monitor the placement of the optical waveguide material 212 and align the optical waveguide material 212 with the first laser 200. The contour 224 and fiducial markers 232 can be programmed such that the set of fiducial markers 232 are in a spaced relationship with the contour 224, defined by coordinates and a predefined separation between the contour 224 and the fiducial markers 232. The contour 224 and fiducial markers 232 together define a singulation pattern or program for manufacturing an optical device.

To singulate the optical waveguide material 212 at the contour 224, the first laser beam 204 is directed from the first laser 200 onto a first side 208 of the optical waveguide material 212. The first laser beam 204 generates a first set of perforations 220 in the optical waveguide material 212. The first set of perforations 220 is illustrated and described in more detail with reference to FIG. 4B. In some embodiments, the first laser beam 204 generates the first set of perforations 220 by chemically altering a first portion of the optical waveguide material 212 at the contour 224. The first portion of the optical waveguide material 212 corresponds to the first set of perforations 220. The first laser beam 204 can induce a photolytic or pyrolytic mechanism of material alteration of the first portion of the optical waveguide material 212 at the contour 224. The first portion of the optical waveguide material 212 can photochemically decompose as a result of the relatively higher excitation energies breaking chemical bonds in the first portion of the optical waveguide material 212, leaving an inhomogeneous residual material at the site of exposure. The first portion of the optical waveguide material 212 is left weaker, more brittle, or more discontinuous compared to before the chemical alteration. The first portion of the optical waveguide material 212 can also decompose thermally, depending on the specific material, the laser energy, or the pulse rate.

In some embodiments, the first laser beam 204 generates the first set of perforations 220 by ablating the first portion of the optical waveguide material 212 at the contour 224, such that the first set of perforations 220 extend through the optical waveguide material 212 from the first side 208 to the second side 216, as illustrated and described in more detail with reference to FIG. 4B. The diameter of each perforation of the first set of perforations 220 can vary along a length of the perforation. The chemical alteration of the first portion of the optical waveguide material 212 at the contour 224 takes place before the ablation.

In some embodiments, a focus offset of the first laser beam 204 is in a range from −0.3 mm to 0.3 mm. The focus offset of the first laser beam 204 is sometimes referred to as the z-offset. The focus offset setting of the first laser beam 204 is used to direct (focus) the first laser beam 204 onto the contour 224. In some embodiments, a number of pulses per burst of the first laser beam 204 is in a range from 4 to 15. The number of pulses per burst can be adjusted by the system 250, which is illustrated and described in more detail with reference to FIG. 2B, to adjust a cutting rate or sharpness of cut in accordance with the physical characteristics of the optical waveguide material 212. The number of pulses per burst aggregates all the pulses in a burst as well the equivalency of the pulses to the burst energy from the first laser 200. When the number of pulses per burst is relatively smaller, the difference in energy levels between a first pulse and a second pulse is relatively greater compared to when a relatively greater number of pulses per burst is used, where the difference in the energy levels between pulses is relatively smaller. In some embodiments, a power of the first laser beam 204 is in a range from 45 W to 55 W. The power of the first laser beam 204 is an important factor affecting penetration into the optical waveguide material 212 and the generation of the first set of perforations 220. The rate of generation of the first set of perforations 220 increases as the power of the first laser beam 204 increases.

A computer numerically controlled speed of the first laser beam 204 can be in a range from 4 m/minute to 15 m/minute. The computer numerically controlled speed of the first laser beam 204 can be adjusted by a singulation program executed by the system 250 in FIG. 2B for manufacturing an optical eyepiece. For example, the system 250 in FIG. 2B can execute a computer numerical control (CNC) configuration that defines the manufacturing task (singulation) to be performed and the cutting speed of the first laser 200. The CNC configuration is a coded program set of instructions that controls the motor 254, the first laser 200, or other machine tool movement to meet the manufacturing specifications.

The optical waveguide material 212 is rotated about an axis 228 in a plane of the optical waveguide material 212, such that a second side 216 of the optical waveguide material 212 faces a second laser 236. For example, the plane of the optical waveguide material 212 can be the plane of the first side 208. The second side 216 of the optical waveguide material 212 is opposite the first side 208. The optical waveguide material 212 can be rotated by a motor 254, of the system 250 in FIG. 2B. For example, the robot 110, illustrated and described with reference to FIG. 1, can include the motor 254. In some embodiments, the first laser 200 and the second laser 236 are the same. A frequency of the first laser 200 and the second laser 236 can be in a range from 100 kHz to 300 kHz. The frequency of the first laser 200 and the second laser 236 specifies the number of laser pulses per second. The amount of energy per photon increases as the frequency of the first laser 200 or the second laser 236 increases.

Figure 4A:
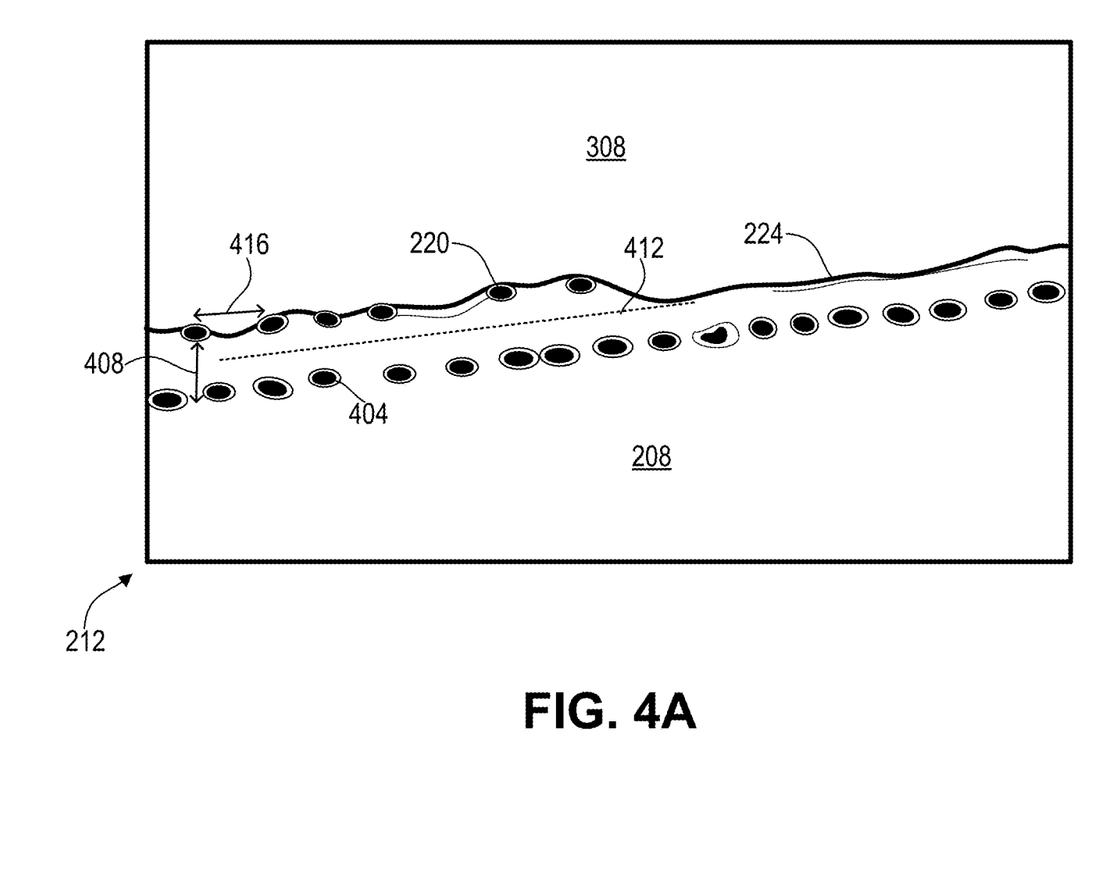
FIG. 4A illustrates a singulated optical waveguide material.

A second laser beam is emitted by the second laser 236 and directed onto the second side 216 of the optical waveguide material 212 to generate a second set of perforations 404 in the optical waveguide material 212. The second set of perforations 404 is illustrated with reference to FIG. 4A. The first set of perforations 220 and the second set of perforations 404 define a perforation zone 412 at the contour 224, as illustrated in FIG. 4A. In some embodiments, the second laser beam generates the second set of perforations 404 by chemically altering a second portion of the optical waveguide material 212 at the contour 224. The second portion corresponds to the second set of perforations 404. In some embodiments, the second laser beam generates the second set of perforations 404 by ablating the second portion of the optical waveguide material 212 at the contour 224. The diameter of each perforation of the second set of perforations 404 can vary along a length of the perforation from the second side 216 to the first side 208.

A third laser beam is emitted by the third laser 240 and directed at the perforation zone 412 to singulate the optical waveguide material 212 at the perforation zone 412. In some embodiments, the third laser 240 is a carbon dioxide ($CO_2$) laser. In other embodiments, the third laser 240 is a radio frequency (RF)-excited, pulsed $CO_2$ separation laser. In some embodiments, the third laser beam includes infrared light having a wavelength in a range from 5 μm to 15 μm. In some embodiments, a focus offset range of the third laser beam is less than 5 mm. The focus offset or z-offset of the third laser beam is used to direct (focus) the third laser beam onto the perforation zone 412 for singulating the optical waveguide material 212. In some embodiments, a frequency of the third laser beam is in a range from 10 kHz to 20 kHz. The frequency of the third laser specifies the number of laser pulses per second. The amount of energy per photon decreases as the wavelength of the third laser beam increases. In some embodiments, a power of the third laser beam is in a range from 10 W to 35 W. The rate of singulation of the optical waveguide material 212 increases as the power of the third laser beam increases.

Figure 2B:
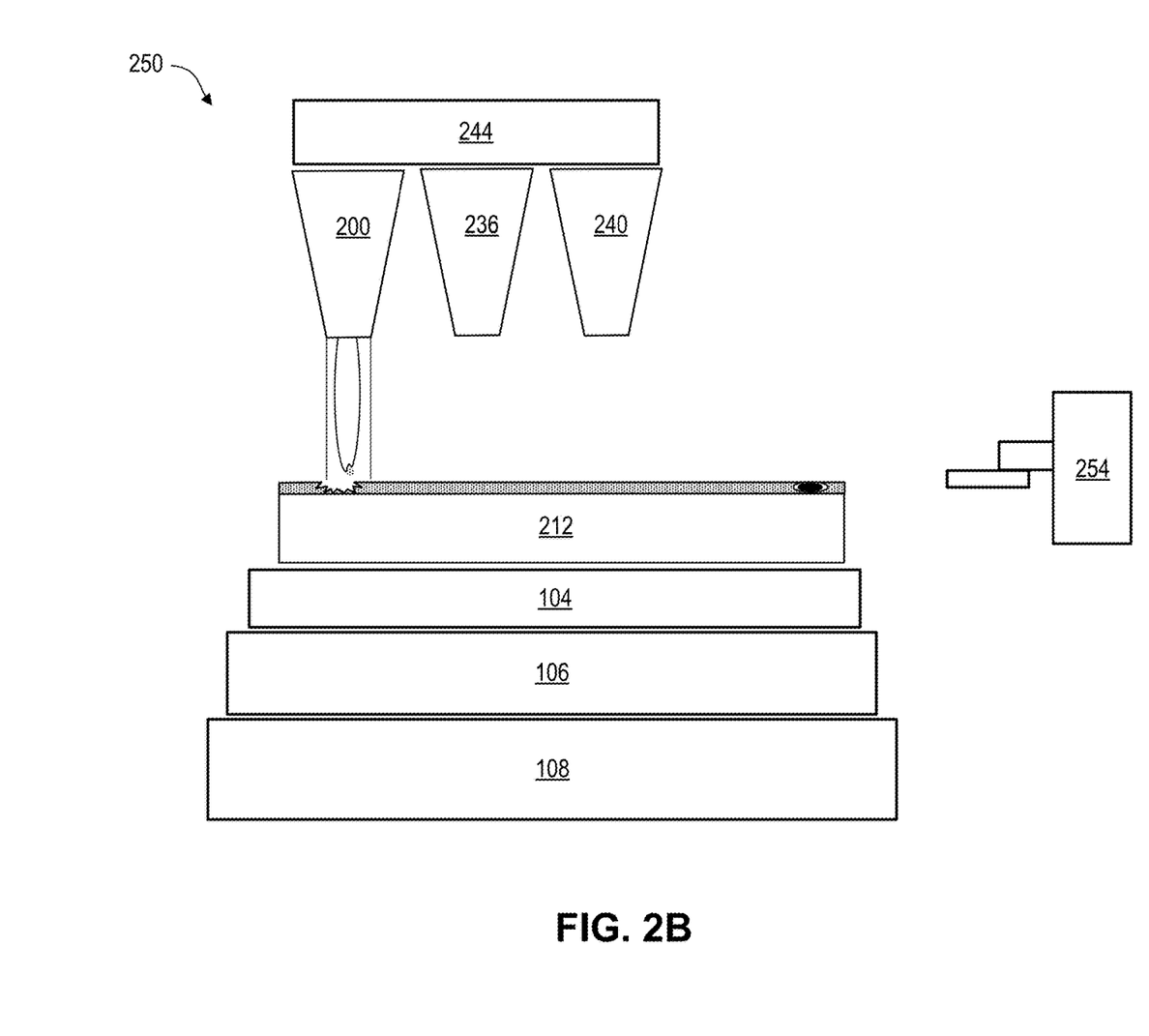
FIG. 2B illustrates a side view of a system that forms a singulated contour on a substrate.

FIG. 2B illustrates a side view of a system 250 that forms a singulated contour on a substrate. The system 250 includes the substrate chuck 104 and air bearing 106, illustrated and described in more detail with reference to FIG. 1. The air bearing 106 provides motion about the X, Y, or Z-axes. The air bearing 106 and the substrate chuck 104 are positioned on the stage 108. In some embodiments, the motor 254 positions the optical waveguide material 212 on the substrate chuck 104. The stage 108 and the optical waveguide material 212 are illustrated and described in more detail with reference to FIGS. 1 and 2A. The system 250 further includes a laser module 244 driving the first laser 200, the second laser 236, and the third laser 240. The first laser 200, the second laser 236, and the third laser 240 are illustrated and described in more detail with reference to FIG. 2A.

In some embodiments, the stage 108 illustrated in FIG. 2B is a CNC stage that can be moved along one or more directions of motion (axes) by motors in accordance with a singulation program. The system 250 can have a stationary laser module 244 attached to the first laser 200, the second laser 236, and the third laser 240. In some embodiments, the stage 108 is a non-moving, stationary stage and the system 250 includes a CNC laser module 244. The CNC laser module 244 can move each laser using rapid positioning movements, straight line motion, or circular motion in accordance with the singulation program. In other embodiments, the system 250 includes a CNC stage 108 and a CNC laser module 244 that each operate in accordance with the singulation program.

FIG. 3 illustrates a planar view of an optical waveguide material 212. The optical waveguide material 212 is illustrated and described in more detail with reference to FIG. 2A. An example singulation pattern or program for manufacturing an optical device using the optical waveguide material 212 shown in FIG. 3 includes six pieces (for example, piece 304) to be singulated from the optical waveguide material 212. Each piece 304 can be used to manufacture an optical eyepiece, for example, for an augmented reality headset. A contour 224 defines a shape of each piece 304 of the optical waveguide material 212 to be singulated. The contour 224 is illustrated and described in more detail with reference to FIG. 2A. The contour 224 is defined by an example singulation pattern or program, for example, stored in a computer-readable memory of the system 250, illustrated and described in more detail with reference to FIG. 2B.

A first laser beam 204 is directed from a first laser 200 onto a first side 208 of the optical waveguide material 212 to incise boundary markers 316, 320 on the first side 208. The first laser 200, the first laser beam 204, and the first side 208 are illustrated and described in more detail with reference to FIG. 2A. The boundary markers 316, 320 are incised prior to directing the first laser beam 204 onto the first side 208 of the optical waveguide material 212 to generate the first set of perforations 220 are illustrated and described in more detail with reference to FIG. 3. The first set of perforations 220 are illustrated and described in more detail with reference to FIG. 4A. The contour 224 is located between the boundary markers 316, 320. The boundary markers 316, 320 decrease wafer-level stresses impacting the optical waveguide material 212 from the surface interaction of the first laser beam 204. The boundary markers 316, 320 define individual, localized regions surrounding the critical areas of interest, where the contour 224 lies. By reducing and localizing the wafer-level surface stress to the critical areas of interest, stress cracks and fractures along the preferential crystalline internal structure are decreased and process yields are increased, compared to traditional methods.

To singulate the optical waveguide material 212 at the contour 224, the first laser beam 204 is directed from the first laser 200 onto the first side 208 of the optical waveguide material 212 to generate the first set of perforations 220. A motor 254 is configured to rotate the optical waveguide material 212 about an axis 228 in a plane of the optical waveguide material 212, such that the second side 216 of the optical waveguide material 212 faces the second laser 236. The axis 228, the second side 216, and the second laser 236 are illustrated and described in more detail with reference to FIGS. 2A and 4B.

Responsive to rotating the optical waveguide material 212, the motor 254 positions the optical waveguide material 212, such that the fiducial markers 232 are in a spaced relationship with the contour 224. The fiducial marker 232 is illustrated and described in more detail with reference to FIGS. 2A and 4B. In some embodiments, an air bearing 106 moves the optical waveguide material 212 laterally on a substrate chuck 104, such that the fiducial markers 232 are in the spaced relationship with the contour 224. The air bearing 106 and substrate chuck 104 are illustrated and described in more detail with reference to FIGS. 1 and 2B.

A second laser beam is directed from the second laser 236 onto the second side 216 of the optical waveguide material 212. The second laser beam generates a second set of perforations (for example, the second set of perforations 404, illustrated and described in more detail with reference to FIG. 4A) in the optical waveguide material 212. The second side 216 of the optical waveguide material 212 is opposite the first side 208. The first set of perforations 220 and the second set of perforations 404 define a perforation zone (for example, the perforation zone 412, illustrated and described in more detail with reference to FIG. 4A) at the contour 224. The contour 224 thus defines a shape of a first piece 304 of the optical waveguide material 212 to be singulated from a second piece 308 of the optical waveguide material 212.

A third laser beam is directed from a third laser (for example, the third laser 240, illustrated and described in more detail with reference to FIG. 3) at the perforation zone 412 to singulate the optical waveguide material 212 at the perforation zone 412.

FIG. 4A illustrates a singulated optical waveguide material 212. The optical waveguide material 212 is illustrated and described in more detail with reference to FIG. 2A. The optical waveguide material 212 is singulated at the contour 224 to separate a first piece of the optical waveguide material 212 from a second piece 308. The contour 224 is illustrated and described in more detail with reference to FIG. 2A. A first laser beam is directed from the first laser 200 onto the first side 208 of the optical waveguide material 212 to generate the first set of perforations 220 in the optical waveguide material 212. The first laser 200, first laser beam 204, first side 208, and first set of perforations 220 are illustrated and described in more detail with reference to FIG. 2A. The first laser beam 204 is moved along the contour 224, such that a distance 416 between a consecutive pair of perforations of the first set of perforations 220 is in a range from 3.5 µm to 8.3 µm.

The second laser beam is directed from the second laser 236 onto the second side 216 of the optical waveguide material 212 to generate the second set of perforations 404 in the optical waveguide material 212. The second laser 236 and second side 216 are illustrated and described in more detail with reference to FIG. 2A. In some embodiments, each perforation of the first set of perforations 220 or the second set of perforations 404 has a maximum diameter less than 10 µm. In some embodiments, the second set of perforations 404 is generated, such that a spacing 408 between the first set of perforations 220 and the second set of perforations 404 is less than a specified accuracy tolerance. In one example, when the system 250 includes a CNC laser module 244, the specified accuracy tolerance of the second laser 236 is used. When the system 250 includes a CNC stage 108, the specified accuracy tolerance of the CNC stage 108 can be used. The specified accuracy tolerance refers to the total allowable error between the intended position of the second laser beam (specified by the singulation pattern or program) and the actual position on the optical waveguide material 212 that the second laser beam contacts. The specified accuracy tolerance can be represented as a permissible error off of a nominal specification. In some embodiments, the specified accuracy tolerance of the second laser 236 is less than 25 µm and the spacing 408 is less than 15 µm.

The first set of perforations 220 and the second set of perforations 404 define a perforation zone 412 at the contour 224. The perforation zone 412 is located between the first set of perforations 220 and the second set of perforations 404. The first laser beam 204 and second laser beam are directed at the optical waveguide material 212, such that the perforation zone 412 aligns with the contour 224 and the optical waveguide material 212 can be singulated at the contour 224.

The optical waveguide material 212 is singulated at the contour 224 by directing a third laser beam from the third laser 240 at the perforation zone 412. The third laser 240 is illustrated and described in more detail with reference to FIG. 2A. The third laser beam singulates the optical waveguide material 212 by heating the optical waveguide material 212 at the perforation zone 412 to expand the first set of perforations 220 and the second set of perforations 404.

Figure 4B:
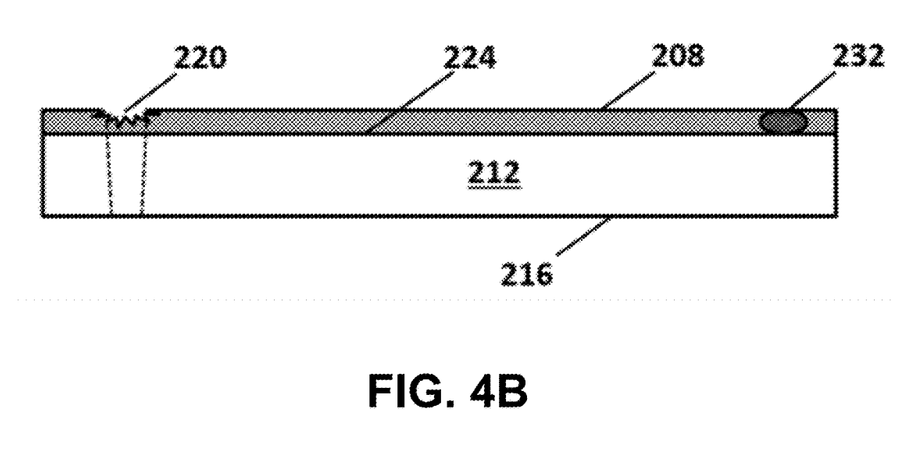
FIG. 4B illustrates a cross section of a first set of perforations in an optical waveguide material.

FIG. 4B illustrates a cross section of the first set of perforations 220 in the optical waveguide material 212. The cross section illustrated in FIG. 4B includes the optical waveguide material 212, the first side 208, the second side 216, the contour 224, and the fiducial marker 232, described in more detail with reference to FIGS. 2A and 4A.

Figure 4C:
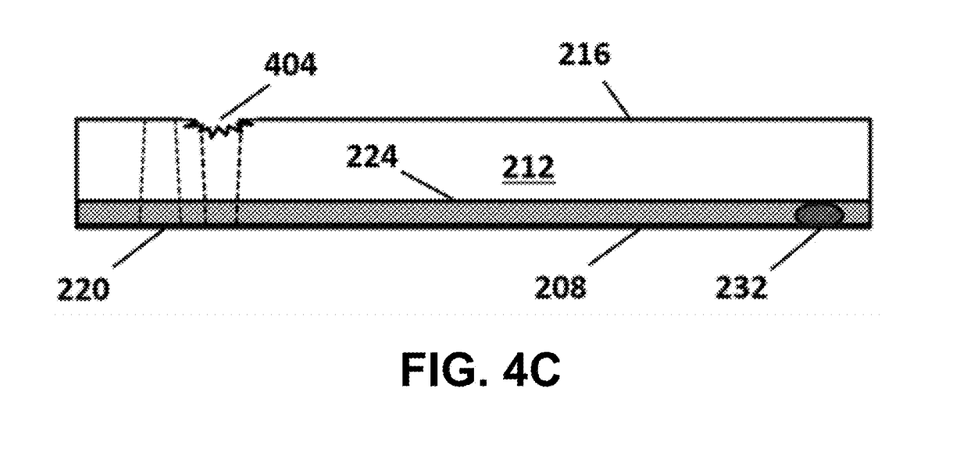
FIG. 4C illustrates a cross section of a second set of perforations in an optical waveguide material.

FIG. 4C illustrates a cross section of the second set of perforations 404 in the optical waveguide material 212. The cross section illustrated in FIG. 4C shows a position of the optical waveguide material 212 after the optical waveguide material 212 has been rotated such that the second side 216 faces the second laser 236. The cross section illustrated in FIG. 4C includes the optical waveguide material 212, the first side 208, the second side 216, the contour 224, and the fiducial marker 232, described in more detail with reference to FIGS. 2A and 4A.

Figure 4D:
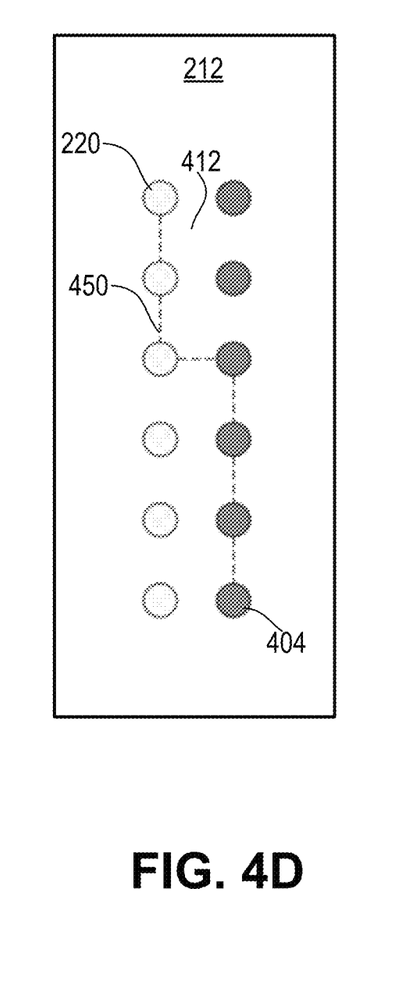
FIG. 4D illustrates a planar view of a singulation path in an optical waveguide material.

FIG. 4D illustrates a planar view of a singulation path 450 in an optical waveguide material 212. The portion of the optical waveguide material 212 illustrated in FIG. 4D includes the first set of perforations 220, the second set of perforations 404, and the perforation zone 412, described in more detail with reference to FIG. 4A. During singulation of the optical waveguide material 212, the two pieces of the optical waveguide material 212 can be separated from each other along one of multiple singulation paths. A particular singulation path connects perforations of the first set of perforations 220 and the second set of perforations 404, such that the two pieces of the optical waveguide material 212 are separated from each other along the particular singulation path. For example, the two pieces of the optical waveguide material 212 in FIG. 4D are separated from each other along the singulation path 450.

Figure 4E:
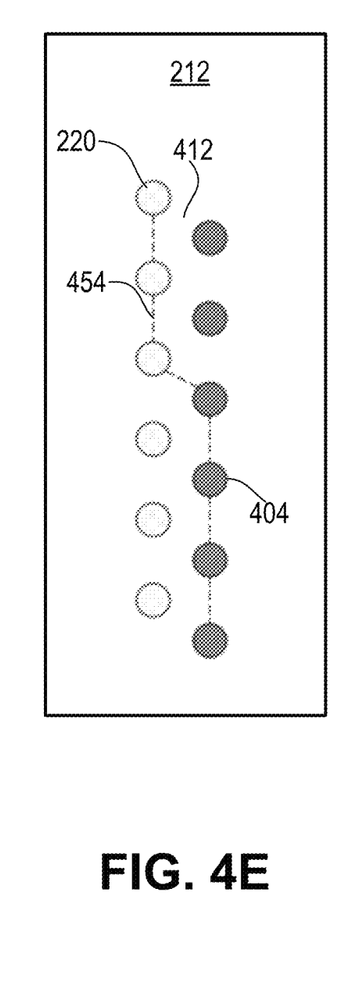
FIG. 4E illustrates a planar view of a singulation path in an optical waveguide material.

FIG. 4E illustrates a planar view of a singulation path 454 in an optical waveguide material 212. The portion of the optical waveguide material 212 illustrated in FIG. 4E includes the first set of perforations 220, the second set of perforations 404, and the perforation zone 412, described in more detail with reference to FIG. 4A. The two pieces of the optical waveguide material 212 in FIG. 4E are separated from each other along the singulation path 454. In other embodiments, a singulation path can traverse multiple sets of perforations. For example, a singulation path can connect a first perforation of the first set of perforations 220, a second perforation of the second set of perforations 404, and a third perforation of the first set of perforations 220.

Figure 5:
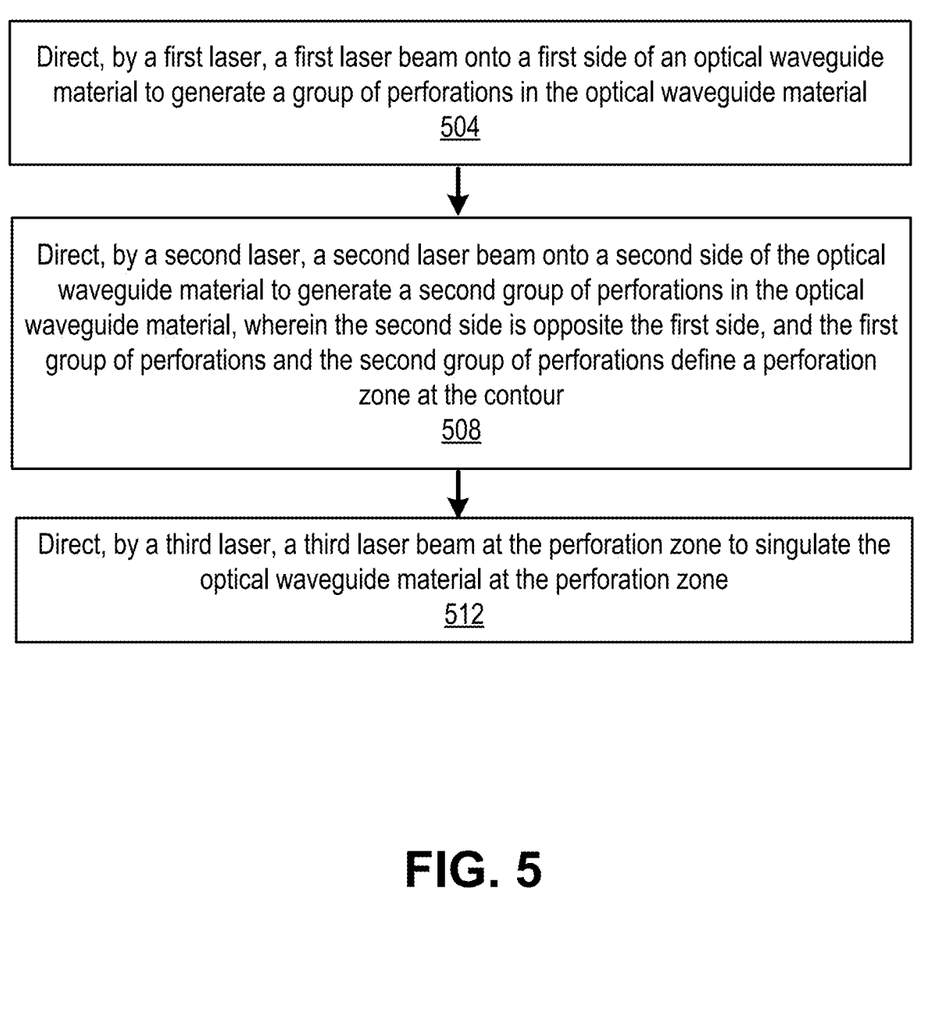
FIG. 5 illustrates a process for singulating an optical waveguide material.

FIG. 5 illustrates a process for singulating an optical waveguide material 212 at a contour 224. The optical waveguide material 212 and contour 224 are illustrated and described in more detail with reference to FIG. 2A. In some embodiments, the process is performed by the system 250, illustrated and described in more detail with reference to FIG. 2B.

In step 504, a first laser beam 204 from a first laser is directed onto a first side 208 of the optical waveguide material 212 to generate a first set of perforations 220 in the optical waveguide material 212. The first laser 200, first laser beam 204, first side 208, and first set of perforations 220 are illustrated and described in more detail with reference to FIG. 2A. In some embodiments, the first laser beam 204 generates the first set of perforations 220 by chemically altering a first portion of the optical waveguide material 212 at the contour 224. The first portion of the optical waveguide material 212 corresponds to the first set of perforations 220. For example, the first laser beam 204 can induce a photolytic or pyrolytic mechanism of material alteration of the first portion of the optical waveguide material 212 at the contour 224. In some embodiments, the first laser beam 204 generates the first set of perforations 220 by ablating the first portion of the optical waveguide material 212 at the contour, such that the first set of perforations 220 extend through the optical waveguide material 212 from the first side 208 to the second side 216.

In step 508, a second laser beam from a second laser 236 is directed onto a second side 216 of the optical waveguide material 212 to generate a second set of perforations 404 in the optical waveguide material 212. The second laser 236 and second side 216 are illustrated and described in more detail with reference to FIG. 2A. The second set of perforations 404 is illustrated and described in more detail with reference to FIG. 4A. The second side 216 is opposite the first side 208. The first set of perforations 220 and the second set of perforations 404 define a perforation zone 412 at the contour 224. The perforation zone 412 is illustrated and described in more detail with reference to FIG. 4A.

In step 512, a third laser beam is directed from a third laser 240 at the perforation zone 412 to singulate the optical waveguide material 212 at the perforation zone 412. The third laser 240 is illustrated and described in more detail with reference to FIG. 2A. The third laser beam singulates the optical waveguide material 212 by heating the optical waveguide material 212 at the perforation zone 412 to expand the first set of perforations 220 and the second set of perforations 404. The process of FIG. 5 was used to manufacture optical waveguides using a 150 mm wafer (the optical waveguide material 212). The resulting optical waveguides were found to have no internal cracks or fractures from heat or stress. Moreover, the optical waveguides had reduced edge defect levels and increased area usage over the optical waveguide material 212, compared to traditional methods.

In additional embodiments, the second laser is configured to emit the second laser beam to generate the second set of perforations, such that a spacing between the first set of perforations and the second set of perforations is less than a specified accuracy tolerance. The specified accuracy tolerance is less than 25 µm and the spacing is less than 15 µm.

In some embodiments, the third laser is configured to emit the third laser beam to singulate the optical waveguide material by heating the optical waveguide material at the perforation zone to expand the first set of perforations and the second set of perforations.

In some embodiments, the first laser and the second laser are the same, and a frequency of the first laser is in a range from 100 kHz to 300 kHz.

In some embodiments, the contour defines a shape of a first piece of the optical waveguide material to be singulated from a second piece of the optical waveguide material.

In some embodiments, the optical waveguide material includes a crystalline material having a refractive index greater than 1.6.

In some embodiments, the third laser is a $CO_2$ laser, and a wavelength of the third laser beam is in a range from 5 µm to 15 µm.

In some embodiments, the first laser is a diode-pumped laser, and a wavelength of the first laser beam is in a range from 750 nm to 1500 nm.

In some embodiments, the optical waveguide material is less than 1 mm thick and each perforation of the first set of perforations and the second set of perforations has a maximum diameter less than 10 µm.

In some embodiments, a distance between a consecutive pair of perforations of the first set of perforations is in a range from 3.5 µm to 8.3 µm.

In some embodiments, a focus offset of the first laser beam is in a range from −0.3 mm to 0.3 mm, and a number of pulses per burst of the first laser beam is in a range from 4 to 15.

In some embodiments, a power of the first laser beam is in a range from 45 W to 55 W, and a computer numerically controlled speed of the first laser beam is in a range from 4 m/minute to 15 m/minute.

In some embodiments, a wavelength of the third laser beam is in a range from 5 µm to 15 µm, and a focus offset range of the third laser beam is less than 5 mm.

In some embodiments, a frequency of the third laser beam is in a range from 10 kHz to 20 kHz, and a power of the third laser beam is in a range from 10 W to 35 W.

In the foregoing description, embodiments have been described with reference to numerous specific details that may vary from implementation to implementation. The description and drawings are, accordingly, to be regarded in an illustrative rather than a restrictive sense.

The invention claimed is:

1. A method for singulating an optical waveguide material at a contour, the method comprising:
   directing a first laser beam from a first laser onto a first side of the optical waveguide material to generate a first plurality of perforations in the optical waveguide material;
   directing a second laser beam from a second laser onto a second side of the optical waveguide material to generate a second plurality of perforations in the optical waveguide material, wherein the second side is opposite the first side, and the first plurality of perforations and the second plurality of perforations define a perforation zone at the contour; and
   directing a third laser beam from a third laser at the perforation zone to singulate the optical waveguide material at the perforation zone.

2. The method of claim 1, wherein the first laser beam generates the first plurality of perforations by chemically altering a first portion of the optical waveguide material at the contour, the first portion corresponds to the first plurality of perforations, the second laser beam generates the second plurality of perforations by chemically altering a second portion of the optical waveguide material at the contour, and the second portion corresponds to the second plurality of perforations.

3. The method of claim 1, wherein the first laser beam generates the first plurality of perforations by ablating a first portion of the optical waveguide material at the contour, the first portion corresponds to the first plurality of perforations, the second laser beam generates the second plurality of perforations by ablating a second portion the optical waveguide material at the contour, and the second portion corresponds to the second plurality of perforations.

4. The method of claim 1, further comprising rotating the optical waveguide material about an axis in a plane of the optical waveguide material, such that the second side faces the second laser.

5. The method of claim 4, further comprising instantiating, by the first laser beam, a plurality of fiducial markers in the optical waveguide material, the plurality of fiducial markers in a spaced relationship with the contour.

6. The method of claim 5, further comprising responsive to the rotating of the optical waveguide material, positioning the optical waveguide material, such that the fiducial markers are in the spaced relationship with the contour.

7. The method of claim 5, further comprising moving the optical waveguide material laterally on a substrate chuck, such that the fiducial markers are in the spaced relationship with the contour.

8. The method of claim 1, further comprising directing the first laser beam onto the first side of the optical waveguide material to incise boundary markers on the first side prior to the directing of the first laser beam onto the first side of the optical waveguide material to generate the first plurality of perforations, such that the contour is located between the boundary markers.

9. The method of claim 1, wherein the second plurality of perforations is generated, such that a spacing between the first plurality of perforations and the second plurality of perforations is less than a specified accuracy tolerance.

10. The method of claim 1, wherein singulating the optical waveguide material at the perforation zone comprises heating the optical waveguide material at the perforation zone to expand the first plurality of perforations and the second plurality of perforations.

11. The method of claim 1, wherein the first laser and the second laser are the same, and a frequency of the first laser is in a range from 100 kHz to 300 kHz.

12. An apparatus for singulating an optical waveguide material at a contour, the apparatus comprising:
a first laser configured to emit a first laser beam onto a first side of the optical waveguide material to generate a first plurality of perforations in the optical waveguide material;
a second laser configured to emit a second laser beam onto a second side of the optical waveguide material to generate a second plurality of perforations in the optical waveguide material, wherein the second side is opposite the first side, and the first plurality of perforations and the second plurality of perforations define a perforation zone at the contour; and
a third laser configured to emit a third laser beam at the perforation zone to singulate the optical waveguide material at the perforation zone.

13. The apparatus of claim 12, wherein the first laser beam generates the first plurality of perforations by chemically altering a first portion of the optical waveguide material at the contour, the first portion corresponds to the first plurality of perforations, the second laser beam generates the second plurality of perforations by chemically altering a second portion of the optical waveguide material at the contour, and the second portion corresponds to the second plurality of perforations.

14. The apparatus of claim 12, wherein the first laser beam generates the first plurality of perforations by ablating a first portion of the optical waveguide material at the contour, the first portion corresponds to the first plurality of perforations, the second laser beam generates the second plurality of perforations by ablating a second portion the optical waveguide material at the contour, and the second portion corresponds to the second plurality of perforations.

15. The apparatus of claim 12, further comprising a motor operatively coupled to the optical waveguide material and configured to rotate the optical waveguide material about an axis in a plane of the optical waveguide material, such that the second side of the optical waveguide material faces the second laser.

16. The apparatus of claim 15, wherein the first laser is further configured to instantiate, by the first laser beam, a plurality of fiducial markers in the optical waveguide material, the plurality of fiducial markers in a spaced relationship with the contour.

17. The apparatus of claim 16, wherein the motor is further configured to position the optical waveguide material, responsive to rotating of the optical waveguide material, such that the plurality of fiducial markers are in the spaced relationship with the contour.

18. The apparatus of claim 16, further comprising an air bearing configured to move the optical waveguide material laterally on a substrate chuck, such that the fiducial markers are in the spaced relationship with the contour.

19. The apparatus of claim 12, wherein the first laser is further configured to emit the first laser beam onto the first side of the optical waveguide material to incise boundary markers on the first side prior to emitting the first laser beam onto the first side of the optical waveguide material to generate the first plurality of perforations, such that the contour is located between the boundary markers.

20. The apparatus of claim 12, wherein the second laser is configured to emit the second laser beam to generate the second plurality of perforations, such that a spacing between the first plurality of perforations and the second plurality of perforations is less than a specified accuracy tolerance.

* * * * *